United States Patent Office 3,492,177
Patented Jan. 27, 1970

3,492,177
PSEUDO-PLASTIC ROCKET PROPELLANTS CONTAINING HYDRAZINES WITH HYDROXYPROPYL CELLULOSE ETHER
Eric Rau, Trenton, N.J., and Daniel Warren, Murrysville, Pa., assignors to FMC Corporation, New York, N.Y., a corporation of Delaware
No Drawing. Filed Aug. 26, 1964, Ser. No. 392,317
Int. Cl. C06d 5/00; C10l 7/00
U.S. Cl. 149—20         5 Claims This invention relates to pseudo-plastic rocket propellants and more particularly to gelled liquid rocket propellants having pseudo-plasticity, that is, being solid under static conditions, but capable of liquid flow under stress.

Materials in use as rocket propellants are either soilds or liquids, and both types have inherent disadvantages. Solid propellants often are easier to store and handle than the liquid propellants but they are less versatile in that their burning is not easily controlled. Since it is highly desirable to be able to control the rate of combustion and even to turn off the combustion of a rocket propellant, solid propellants have been limited in their use.

Liquid propellants, on the other hand, have been widely accepted. However, they are quite hazardous since they can be spilled during loading or leak from tiny cracks during storage in the rocket, thereby creating the danger of fire or even explosion. Moreover, since the trajectory of a rocket must be carefully controlled, it is necessary that storage tanks for liquid propellants be baffled or compartmentized to prevent the liquid propellant from shifting its weight and thereby shifting the center of gravity of the rocket.

Hydrazine has proven to be one of the best liquid rocket fuels because of its relatively high energy level. However, because of the fire and explosion hazard of this propellant, it is commonly used in admixture with unsymmetrical dimethylhydrazine which has a slightly reduced energy level, but which in such mixture materially improves the safety of the hydrazine. The energy level and density of liquid propellants containing unsymmetrical dimethylhydrazine, such as a 50/50 mixture of hydrazine and unsymmetrical dimethylhydrazine, can be substantially improved by the addition of high energy additives such as aluminum( beryllium and boron. For example, a maximum energy level for mixed hydrazine propellants is achieved by the presence of 35 to 50% of aluminum powder in the liquid propellant. However, maintaining a homogeneous mixture of the metal powder and liquid propellant is difficult.

In an effort to overcome the disadvantages of liquid propellants while maintaining their advantages over solid propellants, it has been suggested that gelled liquid propellants be employed. For example, it has been suggested that silica gel be used as a gelling agent for liquid hydrazine propellants. However, it takes at least about 5% of silica to gel these propellants and the large amount of inorganic residue resulting from this gelling agent is undesirable, particularly since it lowers the energy of the propellant. Many other gelling agents have been suggested, but none has been completely successful, particularly because a satisfactory degree of pseudo-plasticity has not been provided by their use. It is highly desirable that the gelled propellant have the properties of a solid under static conditions while at the same time having the flow properties of a liquid when subjected to stress. Such a material would possess the advantages of both solid and liquid propellants, but the disadvantages of neither.

It is an object of this invention to provide a high energy gelled liquid rocket propellant.

Another object is to provide a high energy rocket propellant which is pseudo-plastic, that is, which has the properties of a solid under static conditions and the properties of a liquid under stress.

These and other objects will become apparent from the following description of this invention.

We have now discovered a gelled rocket propellant which has the properties of a solid under static conditions and the properties of a liquid under stress, which comprises hydrazine and unsymmetrical dimethylhydrazine in a weight ratio of 40 to 80 parts of the former to 60 to 20 parts of the latter, and as a gelling agent therefor, 0.1 to 5.0%, based upon the total weight of hydrazine and unsymmetrical dimethylhydrazine, of a hydroxypropyl cellulose ether having a degree of hydroxypropyl substitution designated as MS 2.5 to 7, and preferably of 3.5 to 4.5. Moreover, these gels form stable mixtures with solid high energy additives such as aluminum, beryllium and boron, and unlike many previous gelled liquid propellants, the gels of this invention are stable for extended periods of time and possess truly pseudo-plastic properties. Surprisingly, the gelling agent does not form gels with hydrazine alone.

The gelled rocket propellants of this invention are prepared by first mixing hydrazine and unsymmetrical dimethylhydrazine in a ratio of 40 to 80 parts by weight of the former to 60 to 20 parts by weight of the latter. Mixtures within this range are the most useful mixtures of hydrazine and unsymmetrical dimethylhydrazine for rocket propellant purposes, and the resulting gels have optimum physical properties. The preferred ratio of hydrazine and unsymmetrical dimethylhydrazine from both a propellant standpoint and gel property consideration is 45 to 75 parts by weight of hydrazine to 55 to 25 parts by weight of the unsymmetrical dimethylhydrazine.

The gelling agent of this invention is a hydroxypropyl cellulose ether having a degree of substitution, expressed as an MS value, of 2.5 to 7 and preferably of 3.5 to 4.5. The MS value represents the average number of hydroxypropyl groups substituted on each glucose unit of the cellulose molecule. While in theory only 3 substitutions are possible per cellulose unit, values higher than 3 are achieved because the hydroxyl groups on the hydroxypropyl radicals sometimes react so that substitution occurs on these hydroxypropyl substituents as well as on glucose hydroxyl groups.

The hydroxypropyl cellulose ethers are provided by causticization of cellulose to provide an alkali cellulose, which then is esterified with propylene oxide. Typical materials of this kind are available from Hercules Powder Company, Wilmington, Delaware, as Klucel HA and Klucel HW. These materials have an MS value of 3.5 to 4.5, and the following viscosities.

TABLE 1

| Klucel type | Viscosity of Klucel solutions, cps.[1] | | | |
|---|---|---|---|---|
| | Percent in water | | Percent in anhydrous ethanol | |
| | 1 | 2 | 1 | 2 |
| HA | | | >1,000 | |
| HW | 1,500–2,500 | | Insoluble | |

[1] Viscosities were determined at 25° C. using a Brookfield LVF Viscometer. For readings above 4,000 cps. the spindle speed was as fast as is possible with the instrument, and spindle #4 was employed. For values between 1,000–4,000 spindle #2 was used at a speed of 30 r.p.m.

These materials are available as white, solid granules, 95% of which pass through a 30 mesh screen and 99% of which pass through a 20 mesh screen. Two percent aqueous solutions of the Klucels have a pH of 6.0 to 8.0.

The amount of gelling agent necessary to form a pseudo-plastic rocket propellant in accordance with this invention depends upon the ratio of hydrazine and unsymmetrical dimethylhydrazine present, the type and amount of high energy additive, if any, used and the desired viscosity of the final gel. Generally, the gelling agent is used in amounts of about 0.1 to 5% based on the weight of the hydrazine and unsymmetrical dimethylhydrazine. Preferably, smaller amounts of gelling agent such as 0.5 to 2.0% based upon the total weight hydrazine and unsymmetrical dimethylhydrazine are employed.

The presence of high energy additives, such as aluminum powder, lowers the amount of cellulose ether required for gelling the compositions of this invention. For example, use of 1.2% of hydroxypropyl cellulose ether and 40% of aluminum, based on hydrazine and unsymmetrical dimethylhydrazine weight gives a gel similar to that provided by use of 2.5% of hydroxypropyl cellulose ether and no aluminum. Compositions having maximum energy levels and containing only nominal amouts of gelling agent, can therefore be prepared having highly useful gel characteristics.

The gelled rocket propellants of this invention may also optionally contain solid high energy additives such as aluminum, beryllium and boron. These high energy additives are incorporated in the form of finely divided powders. Although they may be incorporated in any amount up to about 100% of the liquid propellant, they are generally present, when used, in amounts of about 50 to 100% based upon the total weight of the hydrazine and unsymmetrical dimethylhydrazine present. Aluminum powder is the preferred additive and suitably is used in an amount of about 75 to 90% based on the total weight of hydrazine and unsymmetrical dimethylhydrazine present.

The pseudo-plastic rocket propellants of this invention may be carried in ordinary fuel tanks within the rocket; there is no need to baffle or compartmentize the tanks. Under normal storage conditions, the propellant has the properties of a firm gel which retains its shape for extended periods of time. However, when subjected to stress such as being pushed through a tube or nozzle, the pseudo-plastic rocket propellant of this invention becomes fluid and its flow is readily controlled.

The following examples illustrating the novel rocket propellant compositions disclosed herein are presented without any intention that the invention be limited thereto. All parts and percentages are by weight.

EXAMPLE 1

Mixtures of unsymmetrical dimethylhydrazine, hydrazine and Klucel HA were provided in the proportions shown in Table 2, by stirring the unsymmetrical dimethylhydrazine and hydrazine together and adding the Klucel HA to the mixture with stirring. In all cases gels were provided, and the viscosities of these gels are reported in Table 2.

The gels were forced through a hypodermic syringe and when so handled flowed smoothly through the syringe orifice under the shearing force supplied thereby, and upon coming to rest once again re-entered into a gelled condition. This behavior established their pseudo-plastic natures.

TABLE 2
VISCOSITY OF UNSYMMETRICAL DIMETHYLHYDRAZINE/HYDRAZINE GELS CONTAINING 3% KLUCEL HA

| Composition | | Viscosity, cps.[3] |
|---|---|---|
| UDMH [1] (wt. percent) | N$_2$H$_4$ [2] (wt. percent) | |
| 76.5 | 23.5 | 24,500 |
| 66 | 34 | 15,500 |
| 50 | 50 | 26,800 |
| 44 | 56 | 26,200 |
| 37 | 63 | 37,000 |
| 0 | 100 | Did not gel |

[1] Unsymmetrical dimethylhydrazine. [2] Hydrazine.
[3] Measured at 10 r.p.m. on Brookfield Viscometer, using #6 spindle, five hours after mixing.

EXAMPLE 2

Mixtures of equal weights of UDMH and hydrazine were prepared and stirred together with Klucel HA and aluminum powder platelets of a size to pass in an amount of 99%+ through a 325 mesh screen, the Klucel HA and aluminum being used in amounts shown in Table 3 which follows. The mixtures all formed gels which were pumpable, becoming quite fluid upon being exposed to a shearing force. That is, they proved to be pseudo-plastic.

TABLE 3

| Klucel HA | Percent aluminum | Percent UDMH/N$_2$H$_4$ mixture | Viscosity (cps.) [1] |
|---|---|---|---|
| 1.8 | 10 | 88.2 | 16,000 |
| 1.6 | 20 | 78.4 | 23,000 |
| 1.4 | 30 | 68.6 | 39,000 |
| None | 30 | 70.0 | 2,000 |

[1] Measured at 60 r.p.m. on a Brookfield Viscometer, using spindle #6.

EXAMPLE 3

Mixtures of equal weights of UDMH and hydrazine form pseudo-plastic gels with Klucel HW in the same fashion as they do with Klucel HA, demonstrated in Examples 1 and 2 above. The gels of this example likewise become fluid upon being exposed to a shearing or stirring force and therefore are especially useful as rocket propellants. Klucel HW also forms stable and useful pseudo-plastic gels with the herein mixtures of unsymmetrical dimethylhydrazine and hydrazine which contain, in addition, aluminum, beryllium and boron powders, as does Klucel HA.

These examples demonstrate the effectiveness of the hydroxypropyl cellulose ethers in providing pseudo-plastic gelled rocket propellant mixtures of UDMH and hydrazine, with or without the addition of the specified metallic powders. The ability of these gels to be handled and stored in non-liquid condition facilitates their use in rocket systems, as well as in other systems in which fuel mixture of UDHM and hydrazine and possibly a metal powder, are desired. At the same time, their ability to be pumped and otherwise handled as liquids when they are placed under pressure makes possible their use in systems in which they are flowed through pipes and other conduits to the point of use from a storage chamber.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood, that within the scope of the appended claims the invention may be practiced by those skilled in the art and having the benefit of this disclosure otherwise than as specifically described and exemplified herein.

What is claimed is:

1. A pseudo-plastic rocket propellant comprising 40 to 80 percent by weight of hydrazine and 60 to 20 percent by weight of unsymmetrical dimethylhydrazine, and, as a gelling agent therefor, 0.5 to 5.0%, based upon the total weight hydrazine and unsymmetrical dimethyldrazine, of a hydroxypropyl cellulose ether having an MS substitution value of 2.5 to 7.

2. The pseudo-plastic rocket propellant of claim 1 in which the hydroxypropyl cellulose ether has an MS substitution value of 3.5 to 4.5.

3. The pseudo-plastic rocket propellant of claim 1 which also contains 50 to 100%, based upon the total weight of hydrazine and unsymmetrical dimethylhydrazine, of a high energy additive selected from the group consisting of aluminum, beryllium and boron.

4. The pseudo-plastic rocket propellant of claim 1 which contains 45 to 75% by weight of hydrazine and 55 to 25% by weight of unsymmetrical dimethylhydrazine and 1 to 3% of the hydroxypropyl cellulose ether.

5. The pseudo-plastic rocket propellant of claim 3 which also contains 75 to 90% of aluminum based upon upon the total weight of hydrazine and unsymmetrical dimethylhydrazine.

References Cited

UNITED STATES PATENTS

| | | | |
|---|---|---|---|
| 2,954,283 | 9/1960 | Horvitz | 149—36 |
| 3,077,072 | 2/1963 | Rice | 60—252 X |
| 3,081,595 | 3/1963 | Rose | 149—36 |
| 3,116,187 | 12/1963 | Scanlon et al. | 149—36 X |
| 3,230,281 | 1/1966 | Carroz | 264—3 |
| 3,232,801 | 2/1966 | Bost | 149—19 |

BENJAMIN R. PADGETT, Primary Examiner

U.S. Cl. X.R.

149—22, 36